May 4, 1965   L. E. BARTON   3,181,364
APPARATUS FOR MEASURING DIFFERENTIAL TEMPERATURE
Filed July 31, 1962   2 Sheets-Sheet 1
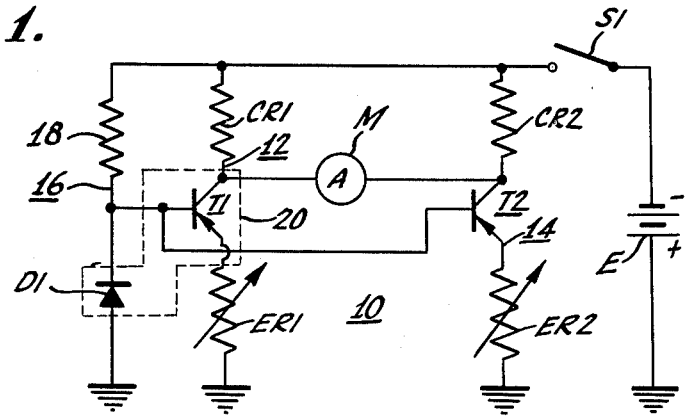
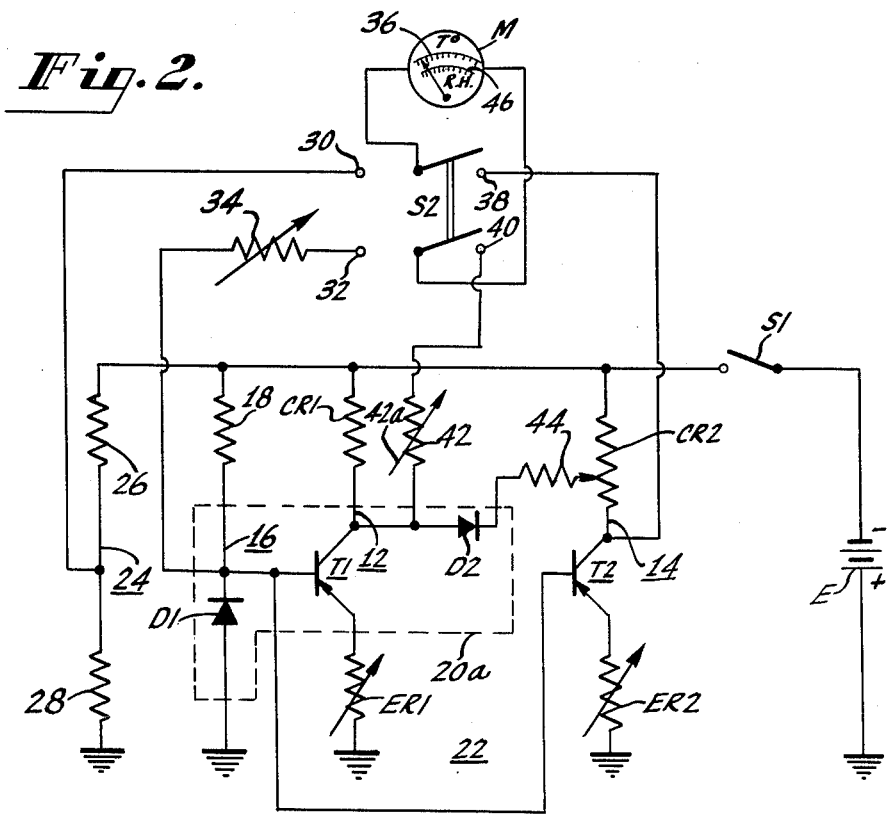
INVENTOR.
LOY E. BARTON
BY
ATTORNEY United States Patent Office 3,181,364
Patented May 4, 1965

3,181,364
APPARATUS FOR MEASURING DIFFERENTIAL TEMPERATURE
Loy E. Barton, Princeton, N.J., assignor to Radio Corporation of America, a corporation of Delaware
Filed July 31, 1962, Ser. No. 213,750
11 Claims. (Cl. 73—342)

This invention relates generally to apparatus for measuring the difference in temperature between two points. The apparatus may also be used as a hygrometer and the like for measuring the percentage of relative humidity in the atmosphere.

Usually, the difference in temperature between two points is obtained by measuring the temperature at each of the points separately and then calculating the difference between the measured temperatures. In using many hygrometers of the wet-dry bulb thermometer type, for example, the percentage of relative humidity is determined, for a number of ambient temperatures, by consulting a chart that indicates the percentages of relative humidity at various calculated differences in temperature between observed wet and dry bulb thermometer temperatures. Thus, to obtain the percentage of relative humidity in the atmosphere by means of many conventional hygrometers, one usually reads both the wet and the dry bulb thermometers, mentally calculates the difference between the two observed temperatures, and then consults a chart for the answer based on such difference.

It is an object of the present invention to provide improved apparatus for measuring differential temperature directly by electronic means.

Another object of the present invention is to provide improved apparatus for indicating a non-linear function of differential temperature, such as percentage of relative humidity at different ambient temperatures, on a linear scale.

Still another object of the present invention is to provide an improved hygrometer that indicates the percentage of relative humidity in the atmosphere directly, without the necessity of making mental calculations or consulting a chart.

A further object of the present invention is to provide improved apparatus for meansuring differential temperatures directly on a meter in a circuit that is relatively simple in construction, very reliable in operation, and highly efficient in use.

In accordance with the present invention, the improved apparatus for mensuring differential temperature comprises, in its present form, a pair of substantially similar transistors connected in a pair of substantially similar parallel circuits. Each of the transistors is biased by a common bias means, such as the voltage across, a forwardly conducting diode. The biasing diode and one of the transistors are fixed to each other so that they may both be exposed to the same temperature at one of the points of the temperature differential to be measured. The voltage across the biasing diode changes with temperature in a direction such that any tendency for the conduction of current through the latter transistor to change because of changes in temperature is offset, and the collector voltage of this transistor is substantially constant for all temperatures. This collector voltage is used as a reference for indicating means. The other transistor, whose conduction of current is a function of temperature, is adapted to be disposed at the other of the points of the temperature differential to be measured. The difference in temperature between the two points can be read on a suitably calibrated meter connected between the two transistors. In an improved hygrometer of the present invention, the meter that indicates the temperature differential is calibrated to indicate the percentage of relaive sumidity as well as the ambient temperature. The scale of the meter can also be linearized by providing circuit means to correct for the non-linearity of the percentage of relative humidity function above a certain predetermined temperature. The improved hygrometer may also be provided with a suitable multiplier to provide accurate percentage of relative humidity readings for relatively low, ambient temperatures.

The novel features of the present invention, both as to its organization and method of operation, as well as additional objects and advantages thereof, will be more readily understood form the following description, when read in connection with the accompanying drawings, in which similar reference characters designate similar parts throughout, and in which:

FIG. 1 is a schematic diagram of one embodiment of the present invention for indicating a difference in temperature between two points;

FIG. 2 is a schematic diagram of an improved electronic hygrometer for indicating both temperature and percentage of relative humidity and embodying the present invention;

Figures 3, 4:
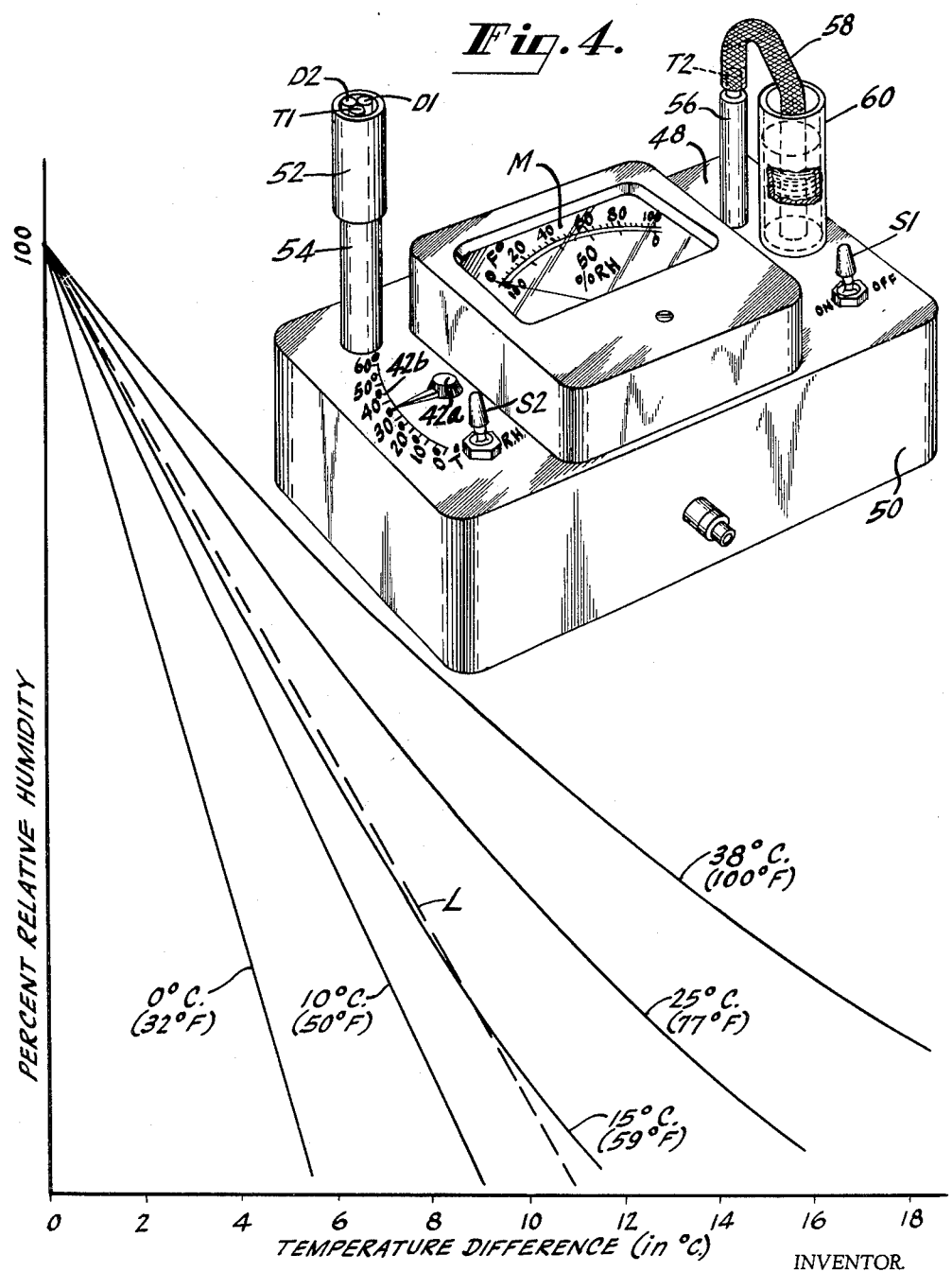
FIG. 3 is a graph showing a family of curves indicating the percentage of relative humidity versus the wet-dry bulb temperature differential for certain ambient temperatures, this graph being used to explain the operation of the hygrometer illustrated in FIGS. 2 and 4.
FIG. 4 is a perspective view of one form of the improved hygrometer illustrated schematically in FIG. 2.

Referring, now, particularly to FIG. 1, there is shown an improved temperature differential measuring circuit 10 employing two transistors T1 and T2 and a diode D1. The transistors T1 and T2 are substantially similar to each other and are connected in substantially similar parallel circuits 12 and 14, respectively. In the circuit 12, the emitter-collector path of the transistor T1 is connected in series with a collector resistor CR1 and an emitter-resistor ER1. In the circuit 14, the emiter-collector path of the transistor T2 is connected in series with a collector resistor CR2 and an emitter resistor ER2.

A source E of voltage is connected acorss the parallely connected circuits 12 and 14 through a switch S1. A bias circuit 16 is also connected in parallel with the parallely connected circuits 12 and 14. The circuit 16 comprises a resistor 18 conected in series with the diode D1. The diode D1 is poled to conduct current in its forward direction, that is, the anode of the diode D1 is connected to the positive terminal of the voltage source E. When current flows through the diode D1, the voltage drop appearing across the diode D1 may be used as bias means for the transistors T1 and T2.

Each of the transistors T1 and T2 is biased similarly so that each will conduct substantially the same amount of current when at the same temperature. The cathode of the diode D1 is connected to the base of the transistor T1 and also to the base of the transistor T2. The anode of the diode D1 is connected to a common connection, such as ground, as is one end of each of the resistors ER1, ER2, and the positive terminal of the voltage source E. Since the components of the circuit 12 are substantially similar to those in the circuit 14, and since the transistors T1 and T2 are biased by the common bias source D1, the conduction of current through each of the transistors T1 and T2 will be substantially the same when the temperature of the transistors T1 and T2 is the same.

An indicating device, such as a micro-ammeter M, is connected between the collectors of the transistors T1 and T2 to indicate any difference in temperature between the transistors T1 and T2. The transistors T1 and T2 can sense changes in heat because the amount of current that flows through them is a function of their ambient temperatures. The hotter the transistor is, the more current it conducts. Thus, the transistors T1 and T2 can be used to sense the temperatures at the two points, respectively, having a temperature differential. The voltage drop across the diode D1, when the latter is conducting, also varies with its temperature. The hotter the diode D1, the smaller is the voltage drop across the diode D1.

The diode D1 and the transistor T1 are disposed physically adjacent to each other as close as possible. This physical proximity is designated in FIG. 1 by the dashed enclosure 20. In practice, the diode D1 and the transistor T1 can be fixed to each other with a small amount of a suitable adhesive, such as epoxy glue. Also, the leads connected to the diode D1 and to the transistors T1 and T2 are relatively long so that the diode D1 and the transistors T1 and T2 may be disposed in the ambient temperatures to be measured. These leads should preferably comprise electrical conductors with a relatively low coefficient of heat conduction to prevent heat losses. The emitter resistors ER1 and ER2 may be variable so as to compensate for slight differences that may exist in the components of the circuits 12 and 14, whereby the current flowing through each of the transistors T1 and T2 may be made the same when the transistors T1 and T2 are at the same temperature.

The operation of the circuit 10, shown in FIG. 1, for measuring the difference in temperature between two points will now be explained: Let it be assumed that the transistor T1 and the diode D1 fixed to it are disposed at a point of one temperature, and the transistor T2 is disposed at a point of another temperature. By closing the switch S1, current flows through the transistors T1 and T2. The amount of current flowing through the transistor T1 is substantially constant with the temperature changes because its bias provided by the diode D1 changes with temperature, whereby the collector current of the transistor T1 remains substantially constant. The amount of current flowing in the transistor T2 is a function of its temperature. If the transistors T1 and T2 are at the same temperature, the meter M indicates zero. If the transistors T1 and T2 are at different temperatures, respectively, current flows through the meter M. Since the amount of current flowing through the meter M is proportional to the difference in temperature between the transistors T1 and T2, the meter M can be calibrated to indicate differences in temperature directly.

An important feature of the present invention is the arrangement of the diode D1 in close proximity with the transistor T1 to sense the same temperature at all times. Since the bias voltage provided by the diode D1 tends to decrease with an increase in temperature, and since the current through the transistor T1 tends to increase with an increase in temperature, the resultant current flowing through the transistor T1 is substantially constant regardless of the temperature of the diode D1 and the transistor T1. Thus, the voltage appearing across the collector resistor CR1 is always substantially the same, and is used as a reference voltage for the meter M.

Referring, now, to FIG. 2, there is shown a circuit 22 that is basically similar to the circuit 10 in FIG. 1, but is modified particularly for use as a hygrometer. Means are provided to utilize the bias diode D1 as the heat sensing element of a thermometer to measure ambient atmospheric temperature. To this end, a circuit 24, is provided comprising serially connected resistors 26 and 28. The common junction of the resistors 26 and 28 is connected to one contact 30 of a pair of fixed contacts of a double-pole, double-throw switch S2. The common junction of the resistor 18 and the diode D1 is connected to the other contact 32 of this pair of fixed contacts of the switch S2 through a variable resistor 34. The meter M is connected between the two poles of the switch S2. Since the voltage across the conduction diode D1 is a function of its temperature, the diode D1 can cause the meter M to indicate the diode temperature when the poles of the switch S2 are in contact with the fixed contacts 30 and 32. The resistor 34 can be adjusted to calibrate a temperature scale 36 on the meter M to indicate the temperature of the diode D1. This temperature is the atmospheric ambient temperature at which the percentage of relative humidity is to be determined.

When the poles of the switch S2 are in contact with the fixed contacts 38 and 40 of the switch S2, one side of the meter M is connected directly to the collector of the transistor T2, and the other side of the meter is connected to the collector of the transistor T1 through a variable resistor 42. The collector of the transistor T1 is connected to a variable tap on the collector resistor CR2 through a circuit consisting of a diode D2 connected in series with a resistor 44.

The curves shown in FIG. 3 will be used to explain the operation of the hygrometer of FIG. 2. The solid lines of the graphs indicate the actual percentages of relative humidity for the wet-dry bulb thermometer temperature differentials at the atmospheric ambient temperatures indicated. From an inspection of these curves, it is observed that the percentage of relative humidity is substantially a linear function of the wet-dry bulb temperature differential for ambient temperatures up to substantially 59° Fahrenheit (F.). For ambient temperatures above 59° F., the percentage of relative humidity is an increasingly non-linear function of the wet-dry bulb temperature differential. The hygrometer circuit 22 incorporates circuitry by means of which these graphs may be simulated with relatively good accuracy on a single linear scale.

The diode D2 in the circuit 22 is a non-linear conducting element that compensates the meter M for percentage of relative humidity indications when the wet-dry bulb temperature differential (between the transistors T1 and T2) occurs at temperatures above 59° F. The tap on the collector resistor CR2 is chosen so that the diode D2 will begin to conduct when the temperature of the transistor T1 (dry bulb thermometer) is at least 59° F. and the temperature of the transistor T2 (wet bulb thermometer) is slightly lower than 59° F. Because of the non-linear compensating effect of the diode D2 and the resistor 44, the non-linear function of the percentage of relative humidity at temperatures above 59° F. can be represented linearly, that is, on a linear scale 46, on the meter M. The current through the diode D2 is a function of its temperature, that is, the current through the diode D2 increases with an increase in its temperature. The diode D2 is fixed as closely as possible to the transistor T1 and the diode D1, as indicated by the dashed line 20a, so as to acquire the same ambient temperature as the latter at all times.

The diode D2 is substantially non-conducting when the transistor T1 is in an ambient temperature of less than 59° F. and the temperature of the transistor T2 is the wet bulb thermometer temperature substantially at the same ambient temperature. Since the percentage of relative humidity is substantially a linear function with the wet-dry bulb temperature differential at ambient temperatures below 59° F., as shown in FIG. 3, means are provided in the circuit 22 to cause the meter M to simulate the percentage of relative humidity at these ambient temperatures on the linear scale 46 of the meter M. To this end, the resistor 42 can be made to function as a multiplier to change the slope of the percentage of relative humidity versus wet-dry bulb temperature differential function for different ambient temperatures. Referring, now to FIG. 4, there is shown a knob 42a that is the variable means of the resistor 42 (FIG. 2). A scale 42b, associated with the knob 42a, is used to set the knob 42a to the ambient temperature below 59° F. so as to provide the meter M with the proper resistance by means of which the meter M will indicate directly the percentage of relative humidity for the ambient temperature.

The physical arrangement of one form of the hygrometer provided with the circuit 22 in FIG. 2, is shown in FIG. 4. The components of the circuit 22 that are not shown on the top surface 48 of a casing 50 are disposed within the casing 50. As shown in FIG. 4, the transistor T1, the diode D1, and the diode D2 are held physically adjacent to each other by means of a suitable heat conducting means, such as an aluminum ring 52, so that they may all sense the same ambient temperature. The leads from the transistor T1, and the diodes D1 and D2 are disposed within a heat insulating tube 54, such as a tube of plastic material. The transistor T2 is spaced from the transistor T1, and its leads are also within a heat insulating tube 56.

A wick 58 has one end in a container 60 of water and another end disposed about the transistor T2 to wet the latter so that it may function as a wet bulb thermometer.

The operation of the hygrometer illustrated in FIGS. 2 and 4 will now be described: The switch S1 is closed to energize the circuits 12, 14, 16 and 24. The poles of the switch S2 are connected to the fixed contacts 30 and 32 to obtain the ambient temperature of the transistor T1, that is, the ambient temperature of the atmosphere. The latter reading is obtained on the scale 36 of the meter M. If the ambient temperature is 59° F., or less, the knob 42a of the resistor 42 is adjusted to indicate the observed atmospheric ambient temperature on the scale 42b. The poles of the switch S2 are now thrown to contact the fixed contacts 38 and 40. In this position, the meter M indicates the percentage of relative humidity directly as a function of the difference in temperature between the transistors T1 and T2.

If the ambient temperature of the atmosphere is 59° F., or more, the knob 42a of the resistor 42 is set to indicate 59° on the scale 42b. The switch S2 is then switched to indicate the percentage of relative humidity by connecting the poles of the switch S2 with the fixed contacts 38 and 40. The diode D2 and the resistor 44 will conduct current at temperatures above 59° F. and function as a shunt across the meter M at these temperatures. The non-linear correction provided by the diode D2 compensates for the non-linear function of the percentage of relative humidity above 59° F. and enables the meter M to read the percentage of relative humidity on the linear scale 46 at these elevated temperatures. This follows from the fact that the compensation diode D2 conducts more heavily at elevated temperatures and causes the percentage of relative humidity to vary linearly with the wet-dry bulb temperature differential, as indicated by the dashed curve L in FIG. 4. Thus, as the temperature differential increases, the diode D2 conduts more and causes the meter M to indicate linearly the non-linear function of percentage of relative humidity.

From the foregoing description, it will be apparent that there has been provided an improved circuit for measuring the difference in temperature between two points, as well as an improved hygrometer for indicating the percentage of relative humidity directly, without the necessity of consulting a chart and/or the necessity of making mental calculations. While most of the circuitry of the present invention has been illustrated in diagrammatic form, various components useful therein, as well as variations in the circuitry itself, all coming within the spirit of this invention, will, no doubt, readily suggest themselves to those skilled in the art. Also, while the circuitry of the present invention has been described in connection with a hygrometer, it will be understood that the circuitry may be useful in other apparatus, such as a calorimeter, for example. Hence, it is desired that the foregoing shall be considered merely as illustrative and not in a limiting sense.

What is claimed is:

1. Apparatus to indicate the difference in temperature between two spaced apart points, said apparatus comprising
   (a) a pair of substantially similar transistors connected in a pair of substantially similar parallel circuits, respectively,
   (b) bias means to provide a voltage that varies inversely with temperature,
   (c) means connecting said bias means to each of said transistors to bias them similarly for conduction of current the conduction of current through said transistors being a function of their temperatures, one of said transistors being adapted to be disposed at one of said two points, said bias means being physically adjacent to said one transistor and tending to bias said one transistor to become less conductive when an increase in temperature tends to make said one transistor more conductive, and vice versa, whereby to maintain the current through said one transistor substantially constant over a range of temperatures, the other of said transistors being adapted to be disposed at the other of said two points, and
   (d) indicating means connected between said parallel circuits to indicate said difference in temperature as a function of the difference in conduction of current through said transistors.

2. Apparatus to indicate the difference in temperature between two spaced apart points, said apparatus comprising
   (a) a pair of similar transistors connected in a pair of similar parallel circuits, respectively, each of said transistors having an emitter, a collector, and a base,
   (b) a diode,
   (c) means to connect a source of voltage to said diode to cause current to flow therethrough in a forward direction and to cause a voltage drop thereacross,
   (d) means connecting said diode between said emitter and said base of each of said transistors to bias them similarly,
   (e) means to connect said circuits to said source of voltage to cause current to flow through said transistors, said diode and one of said transistors being fixed physically next to each other and both being adapted to be disposed at one of said two points, the other of said transistors being adapted to be disposed at the other of said two points, said voltage drop across said diode and the conduction of current through said transistors being a function of their temperatures, said voltage drop varying with temperature in a manner to maintain the current through said one transistor substantially constant at all temperatures, and
   (f) indicating means connected between said transistors to indicate said difference in temperature as a function of the difference in conduction of current through said transistors.

3. Apparatus to indicate the difference in temperature between two spaced apart points, said apparatus comprising
   (a) a pair of similar transistors connected in a pair of similar parallel circuits, respectively,
   (b) each of said transistors having an emitter, a collector and a base,
   (c) each of said circuits comprising a collector resistor and an emitter resistor,
   (d) a diode,
   (e) means to connect a source of voltage to said diode to cause current to flow therethrough in a forward direction and to cause a voltage drop thereacross,
   (f) means connecting said diode between said emitter and said base of each of said transistors to bias them similarly,
   (g) means to connect said circuits to said source of voltage to cause current to flow through said transistors, said diode and one of said transistors being fixed physically adjacent to each other and both being adapted to be disposed adjacent to one of said two points to sense the same ambient temperature, the other of said transistors being adapted to be disposed adjacent to the other of said two points, said voltage drop across said diode and the conduction of current through said transistors being a function of their temperatures, said voltage drop tending to decrease and said conduction through said one transistor tending to increase with an increase in temperature, whereby said conduction through said one transistor is maintained substantially constant for all operating temperatures, and (h) indicating means connected between said collectors of said transistors to indicate said difference in temperature as a function of the difference in conduction of current through said transistors.

4. Apparatus for indicating a non-linear function dependent upon the difference in temperature between two points, said apparatus comprising (a) a pair of substantially similar circuits connected in parallel, (b) each of said circuits having a separate transistor whose conduction of current is a function of temperature, (c) a third circuit connected in parallel with said pair of circuits, (d) said third circuit comprising a common bias means for each of said transistors, (e) means to connect said bias means to said transistors to bias them similarly for conduction of current, whereby each transistor will conduct substantially the same amount of current when energized and when at the same temperature, each of said transistors being adapted to be disposed at a separate one of said points, (f) a non-linear current conducting device, (g) indicating means for indicating said non-linear function, and (h) means connecting said non-linear device in parallel with said indicating means and between said transistors, the voltage drop across said non-linear device being a function of its temperature, and said non-linear device being disposed next to one of said transistors to acquire the same temperature as said one transistor.

5. Apparatus for indicating a non-linear function dependent upon the difference in temperature between two points, said apparatus comprising (a) a pair of substantially similar circuits connected in parallel, (b) each of said circuits having a separate transistor whose conductance of current is a function of temperature, (c) a third circuit connected in parallel with said pair of circuits, (d) said circuit comprising a first diode, (e) means to connect said first diode to each of said transistors to bias them similarly for conduction of current, whereby each transistor will conduct substantially the same amount of current when energized and when at the same temperature, (f) means disposing said diode and one of said transistors adjacent to each other, whereby they may both be placed at one of said two points to sense the same ambient temperature, the other of said transistors being adapted to be disposed at the other of said two points, the voltage drop across said first diode being a function of its temperature and causing said one transistor to conduct a substantially constant current at all temperatures, (g) a second diode, (h) indicating means for indicating said non-linear function, and (i) means connecting said second diode in parallel with said indicating means and between similar corresponding electrodes of said transistors, said second diode also being disposed adjacent to said one transistor to sense the same temperature as said one transistor.

6. Apparatus for indicating relative humidity or the like comprising (a) pair of substantially similar circuits each comprising a transistor, (b) a bias circuit comprising bias means, said bias means having a characteristic that varies with temperature, (c) a fourth circuit comprising a pair of serially connected resistors, (d) means to connect said bias means as a common bias for each of said transistors, (e) means to connect said circuits in parallel and across a source of voltage to cause current to flow therethrough, (f) means to expose said bias means and one of said transistors to the same ambient temperature at which relative humidity is to be determined, (g) means to moisten the other of said transistors, (h) indicating means, (i) means to connect said indicating means between said bias circuit and said fourth circuit to indicate the temperature of said bias means, and (j) means to connect said indicating means between said transistors to indicate the relative humidity as a function of the difference in conduction of said transistors resulting from the difference in their temperatures.

7. Apparatus for indicating relative humidity comprising (a) a pair of substantially similar circuits each comprising a transistor, (b) a bias circuit comprising a diode, said diode having a characteristic that varies with temperature, (c) a fourth circuit comprising a pair of serially connected resistors, (d) means to connect said diode as a common bias for each of said transistors, (e) means to connect said circuits in parallel and across a source of voltage to cause current to flow therethrough, (f) means to expose said diode and one of said transistors to the same ambient temperature at which relative humidity is to be determined, (g) means to wet the other of said transistors, (h) indicating means, (i) means to connect said indicating means between said bias circuit and said fourth circuit to indicate the temperature of said bias means, (j) means to connect said indicating means between said transistors to indicate the relative humidity as a function of the difference in conduction of said transistors resulting from the difference in their temperatures, and (k) non-linear current conducting means connected in shunt with said indicating means to cause said indicating means to indicate relative humidity linearly.

8. Apparatus for indicating relative humidity comprising (a) a pair of substantially similar circuits each comprising a transistor, (b) a bias circuit comprising a resistor and a diode, the voltage across said diode, when conducting being a function of its temperature, (c) a fourth circuit comprising a pair of serially connected resistors, (d) means to connect said diode as a common bias for each of said transistors, (e) means to connect said circuits in parallel and across a source of voltage to cause curent to flow therethrough, (f) means to expose said diode and one of said transistors to the same ambient temperature at which relative humidity is to be determined, (g) means to wet the other of said transistors, (h) switching means,
(i) temperature and percentage of relative humidity indicating means,
(j) means including said switching means to connect said indicating means between the common junction of said serially connected resistors and the common junction of said first named resistor and said diode to indicate said ambient temperature, and
(k) means including said switching means to connect said indicating means between said transistors to indicate the relative humidity as a function of the difference in conduction of said transistors resulting from the difference in their temperatures.

9. Apparatus for indicating relative humidity comprising
(a) a pair of substantially similar circuits each comprising a collector resistor, a transistor, and an emitter resistor,
(b) a bias circuit comprising a resistor and a diode, the voltage across said diode, when conducting, being a function of its temperature,
(c) a fourth circuit comprising a pair of serially connected resistors,
(d) means to connect said diode as a common bias for each of said transistors,
(e) means to connect said circuits in parallel and across a source of voltage to cause current to flow therethrough,
(f) means to expose said diode and one of said transistors to the same ambient temperature at which relative humidity is to be determined,
(g) means to wet the other of said transistors,
(h) switching means,
(i) temperature and percentage of relative humidity indicating means,
(j) means including said switching means to connect said indicating means between the common junction of said serially connected resistors and the common junction of said resistor and said diode in said bias circuit to indicate said ambient temperature, and
(k) means including said switching means to connect said indicating means between said transistors to indicate the relative humidity as a function of the difference in conduction of said transistors resulting from the difference in their temperatures, said last-mentioned connecting means comprising means to change the sensitivity of said indicating means for ambient temperatures below a predetermined temperature.

10. Apparatus for indicating relative humidity comprising
(a) a pair of substantially similar circuits each comprising a collector resistor, a transistor, and an emitter resistor,
(b) a bias circuit comprising a resistor and a diode, the voltage across said diode, when conducting, being a function of its temperature,
(c) a fourth circuit comprising a pair of serially connected resistors,
(d) means to connect said diode as a common bias for each of said transistors,
(e) means to connect said circuits in parallel and across a source of voltage to cause current to flow therethrough,
(f) means to expose said diode and one of said transistors to the same ambient temperature at which relative humidity is to be determined,
(g) means to wet the other of said transistors,
(h) switching means,
(i) temperature and percentage of relative humidity indicating means,
(j) means including said switching means to connect said indicating means between the common junction of said serially connected resistors and the common junction of said resistor and said diode in said bias circuit to indicate said ambient temperature,
(k) means including said switching means to connect said indicating means between said transistors to indicate the relative humidity as a function of the difference in conduction of said transistors resulting from the difference in their temperatures,
(l) non-linear current conducting means, and
(m) means connecting said non-linear current conducting means between said transistors to shunt said indicating means, said non-linear means being disposed adjacent to said one transistor and being conductive only above a predetermined ambient temperature.

11. Apparatus for indicating relative humidity comprising
(a) a pair of substantially similar circuits each comprising a collector resistor, a transistor, and an emitten resistor,
(b) a bias circuit comprising a resistor and a diode, the voltage across said diode, when conducting, being a function of its temperature,
(c) a fourth circuit comprising a pair of serially connected resistors,
(d) means to connect said diode as a common bias for each of said transistors,
(e) means to connect said circuits in parallel and across a source of voltage to cause current to flow therethrough,
(f) means to expose said diode and one of said transistors to the same ambient temperature at which relative humidity is to be determined,
(g) means to wet the other of said transistors,
(h) switching means,
(i) temperature and percentage of relative humidity indicating means,
(j) means including said switching means to connect said indicating means between the common junction of said serially connected resistors and the common junction of said resistor and said diode in said bias circuit to indicate said ambient temperature,
(k) means including said switching means to connect said indicating means between said transistors to indicate the relative humidity as a function of the difference in conduction of said transistors resulting from the difference in their temperatures,
(l) said last-mentioned connecting means comprising means to change the sensitivity of said indicating means for ambient temperatures below a predetermined temperature,
(m) non-linear current conducting means, and
(n) means connecting said non-linear current conducting means between said transistors to shunt said indicating means, said non-linear means being disposed adjacent to said one transistor and having a characteristic that varies with temperature, whereby to cause said indicating means to indicate relative humidity linearly at temperatures above said predetermined temperature.

References Cited by the Examiner
UNITED STATES PATENTS

| | | | |
|---|---|---|---|
| 2,900,820 | 8/59 | Serafin | 73—342 |
| 2,941,154 | 6/60 | Rogers | 330—30 |
| 2,966,061 | 12/60 | Ross | 73—336.5 |
| 2,976,729 | 3/61 | Smith | 73—342 |
| 3,073,969 | 1/63 | Skillen | 330—40 |
| 3,076,339 | 2/63 | Barton | 73—362 |

FOREIGN PATENTS 77,817  6/57  Great Britain.

ISAAC LISANN, *Primary Examiner.*